Jan. 6, 1942.        G. A. LYON        2,268,838
PROCESS FOR MAKING WHEELS
Filed June 4, 1938        2 Sheets-Sheet 1
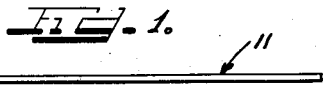
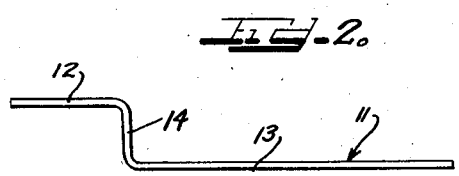
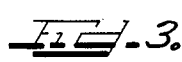
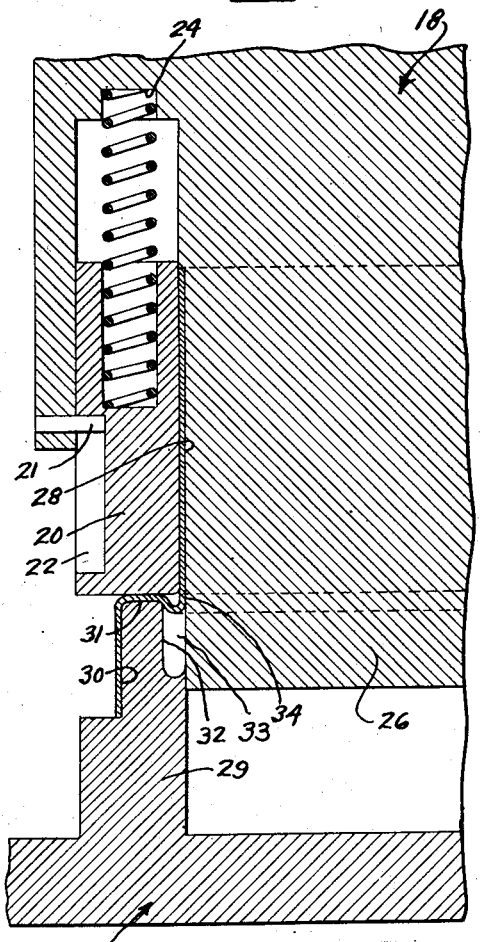
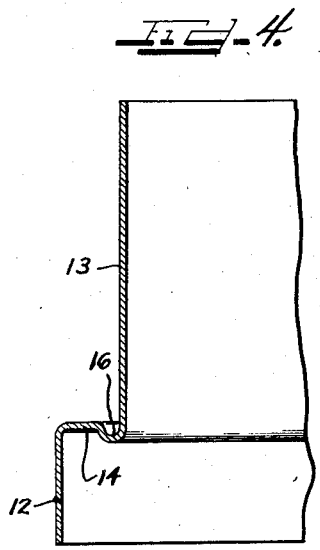
Inventor
GEORGE ALBERT LYON.

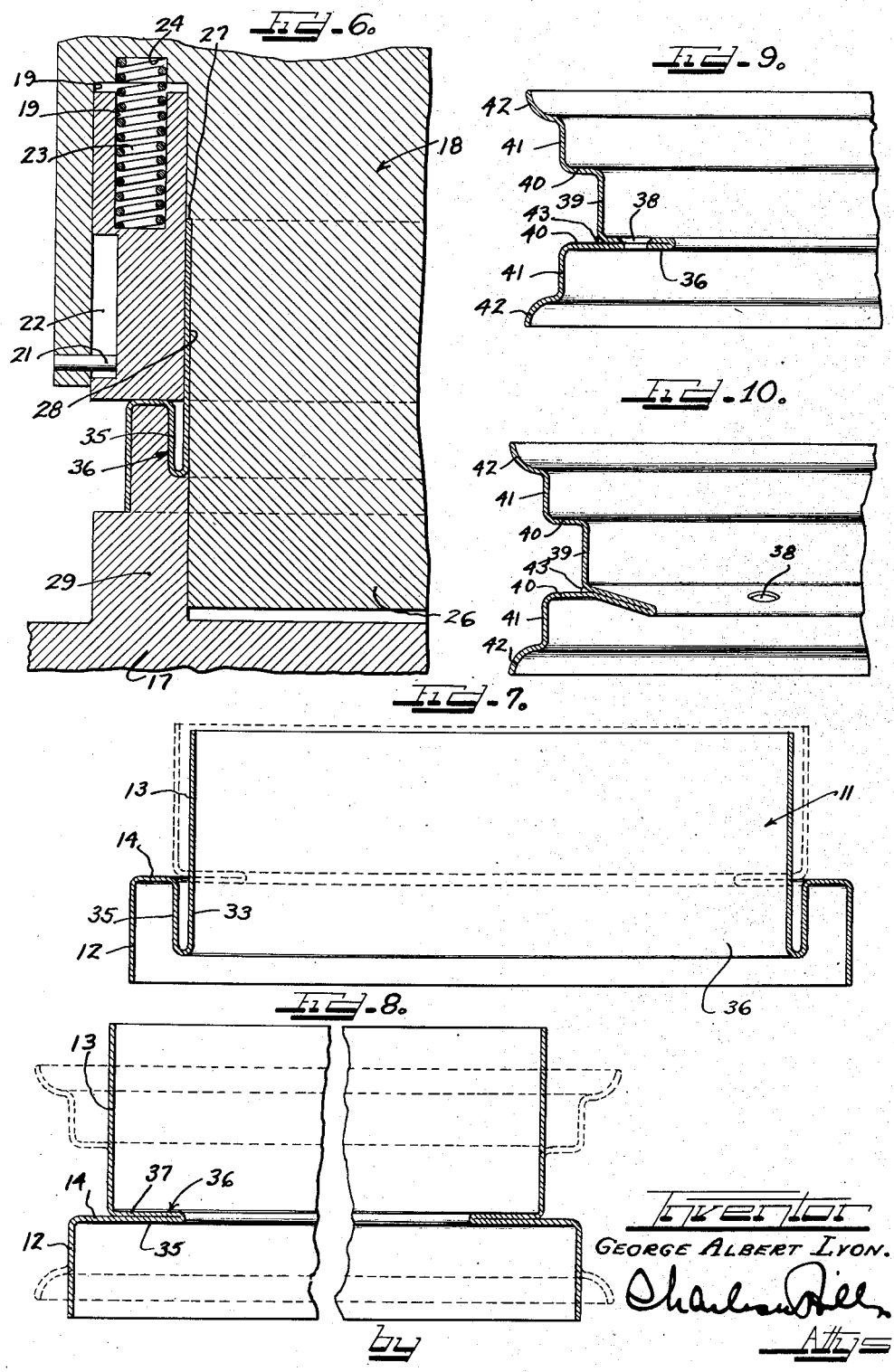

Patented Jan. 6, 1942

2,268,838

UNITED STATES PATENT OFFICE 2,268,838

PROCESS FOR MAKING WHEELS

George Albert Lyon, Allenhurst, N. J.

Application June 4, 1938, Serial No. 211,780

4 Claims. (Cl. 29—159.1)

This invention relates to a process for making a wheel, and more particularly to a novel method for fabricating a wheel for a vehicle which comprises a rim portion having a depending integral folded flange which may be directly connected to a wheel supporting element such as a brake drum.

During the early stages of development of the wheel manufacturing industry, the usual wheel included three cardinal elements: namely, a rim element, a body element, and a hub element. These elements were initially separate, but were fastened together in one manner or another to form the desired wheel. At a much later stage, the hub element was eliminated by designing the body part of the wheel in such a manner as to facilitate its direct connection to the wheel supporting element; such, for example, as the brake drum of an automobile. The resultant economy in manufacturing costs was manifest. Certain recent attempts have been made to still further reduce manufacturing costs by eliminating the conventional body part of the wheel and by providing a rim having a depending integral flange which may be directly connected to the wheel supporting element.

It is an object of this invention to provide a novel method of fabricating a vehicle wheel comprising a rim portion having a depending integral folded flange which may be directly connected to a wheel supporting element, such as a brake drum.

Another object of this invention is to provide a novel method of making a wheel having a rim part and a fastening flange formed of a single sheet of material.

A further object of this invention is to provide a novel process for making a wheel which is extremely economical and which provides a finished product which is rugged and reliable in use.

A still further object of this invention is to provide a novel process for making a wheel which includes causing a folded flange to be formed in a piece of metal stock, the fold being formed by applying an edgewise pressure to the stock to cause a portion thereof to progressively roll and unroll in a confined forming space.

The novel features which I believe to be characteristic of my invention are set forth with particularity in the appended claims. My invention itself, however, both as to its organization, manner of construction, and method of operation, together with further objects and advantages thereof, may best be understood by reference to the following description, taken in connection with the accompanying drawings, in which:

Figure 1 illustrates a flat strip of metal stock which is to be used to form the vehicle wheel;

Figure 2 shows the stock of Figure 1 after it has been pressed or otherwise formed to provide two laterally extending portions disposed in parallel spaced relationship to each other and connected by an integral intermediate flange portion;

Figure 3 shows the metal stock of Figure 2 after it has been bent into a ring shape with its ends welded together;

Figure 4 is a fragmentary cross-sectional view of the ring of Figure 3 after a groove has been formed in the intermediate connecting flange portion adjacent the inner laterally extending portion;

Figure 5 is a cross-sectional fragmentary elevational view of the ring in the die press;

Figure 6 is a view similar to Figure 5, but shows the relative position of the elements of the die press at the end of the flange-forming operation;

Figure 7 is a cross-sectional elevational view of the ring after it is removed from the press;

Figure 8 shows the folded flange as formed in the preceding operation pressed tightly together and then around so as to extend substantially radially inwardly of the ring;

Figure 9 shows the formation of the drop center rim portion from the laterally extending flanges of the ring, as shown in Figure 8; and Figure 10 shows a modified form of wheel in which the folded fastening flange extends radially inwardly at an oblique angle rather than directly radially inwardly as shown in Figure 9.

The various figures of the drawings illustrate the successive steps of my novel process for fabricating a vehicle wheel comprising a drop center rim having an integral depending fastening flange. This novel process will now be described in detail and one novel form of apparatus capable of carrying out the novel steps of the process wherein the folded fastening flange is formed will also be described.

Initially a flat strip 11 of suitable metal stock the end of which is shown in Figure 1, and is rolled or otherwise formed to provide a cross-sectional configuration in the metal strip 11 such as is shown in Figure 2. More particularly the strip of metal stock 11 is provided with two laterally extending spaced portions 12 and 13 and with an intermediate connecting flange portion 14.

The strip of metal stock 11 is thereafter formed into a ring, as is shown in Figure 3, with its ends welded or otherwise suitably joined together, as at 15.

Following the formation of the ring as is shown in Figure 3, a small annular groove 16 is preferably formed in the connecting flange portion 14 adjacent the laterally extending portion 13, as is shown in Figure 4. While the formation of this annular groove 16 has been found to be desirable, it is not an essential step of the process, as will presently appear, but merely facilitates the formation of the folded flange in the die press presently to be described.

The next step of the process is to apply an endwise pressure to the edge of the lateral portion 13 so as to cause the metal at the lower end of the lateral portion 13 adjacent the annular groove 16 to progressively roll and unroll in a forming space in a die block. I have illustrated in Figure 5 a novel die press for carrying out this step of my novel process.

Referring now to Figure 5, there is illustrated at 17 the female member or base block of the press and at 18 the male member, or movable member of the press. The male member 18 is provided with an annular channel 19 in which a hold-down ring 20 is mounted and arranged for limited axial movement, a guide and limit pin 21 mounted on the male member 18 being provided for that purpose. The guide and limit pin 21 extends into a slot 22 on the outer side wall of the hold-down ring 20. A plurality of compression springs 23 are mounted within the channel portion 19 for applying a downward biasing force on the hold-down ring 20. These rings are preferably mounted at one end within a recess 24 in the head of the male member 18 and at their other end in a recess 25 in the top wall of the hold-down ring 20. The central portion 26 of the male member 18 is shaped to engage the edge of the lateral portion 13 of the ring member 11, as at 27, and to extend downwardly along the inner surface of the lateral portion 13, as at 28.

The female member 17 includes a die-ring 29, which is shaped to extend up along the under surface of the lateral portion 12 of the ring member 11, as at 30, and to abut against the intermediate flange 14 of the ring member 11, as at 31. The portion of the female die ring 29 immediately below the annular groove 16 in the intermediate flange 14, however, is cut away as at 32 to provide a forming space 33 into which the metal at the lower end of the lateral portion 13 may be progressively rolled and unrolled or forced to form a folded flange on the ring member 11.

After the ring member 11 as shown in Figure 4 is placed into the press as shown in Figure 5, the male member 18 is caused to move downwardly by the application of axial pressure thereto. As the male member 18 moves downwardly, the metal at the lower end of the lateral portion 13 is forced downwardly into the forming space 33, thereby causing the metal at the lower end 34 of the lateral portion 13 to progressively roll and unroll. The expression "progressively roll and unroll" is employed to define the movement or flow of the metal from its position as part of the lateral flange 13 across the forming space 33 to form the opposite side wall of the fold, as is indicated at 35, in Figure 6.

Figure 6 of the drawings illustrates the male member 18 at its lowermost position. At this stage, a folded flange 36 has been formed in the ring member 11. After the completion of the flange forming operation, as illustrated in Figure 6, the male member 18 is withdrawn from the ring member 11, and the ring member 11 removed. At this stage of the process, the ring member has the shape, as is shown in Figure 7 of the drawings, that is to say, it still has two laterally extending spaced portions 12 and 13, and an intermediate connecting flange portion 14, but in addition it now has the folded fastening flange 36 having an outer side wall portion 35 and an inner side wall portion 37, the inner portion 37, of course, being a continuation of the lateral flange 13.

The next step of the process is to fold the flange 36 from its full line position as shown in Figure 7 to its dotted line position as shown in Figure 7, or to its full line position as shown in Figure 8. This bending or folding of the flange 36 so that it extends substantially radially inwardly may be accomplished in any convenient manner, such as by a rolling operation. At the same time that the flange 36 is being bent or folded so as to extend radially inwardly, the side walls 35 and 37 of the flange 36 are collapsed to lie in intimate contact with each other, as is clearly shown in Figure 8 of the drawings. This collapsing or pressing together of the side walls 35 and 37 of the flange 36 is conveniently brought about during the bending or folding of the flange 36 to its radially inwardly extending position, since in this latter position, the side wall 35 of the flange 36 forms a continuation of the connecting flange portion 14.

The final step of the novel process is to roll or otherwise form the laterally extending portions 12 and 13 into a drop-center rim formation as is shown by the dotted lines in Figure 8 and by the full lines in Figure 9. Thereafter, the necessary holes 38 for the reception of the usual wheel mounting bolts (not shown) are cut in the fastening flange 36. The wheel is now complete and in addition to wheel fastening flange 36, includes a drop-center rim of conventional configuration including a base flange 39, opposite side flanges 40, opposite intermediate flanges 41 and opposite edge portions 42. The above wheel, the method of manufacturing the wheel, and the apparatus employed to carry out the novel process all cooperate to provide an extraordinarily economical wheel to manufacture and yet provide a wheel which is rugged and reliable in use.

Under certain conditions it has been found desirable to provide a wheel in which the fastening flange 36 is not folded all the way from the position shown in Figure 7 to the position as shown in Figure 8, but is caused to assume an intermediate position, such as that shown in Figure 10. A wheel such as that illustrated in Figure 10 may, therefore, be provided by simply bending or pressing the folded flange of Figure 7 into the position as shown in Figure 10.

In both the wheel shown in Figure 9 and the wheel shown in Figure 10, the adjacent wall portions 35 and 37 of the fastening flange 36 are preferably spot-welded together, and a welded joint at 43 is also preferably provided.

While I have shown particular embodiments of my invention, it will, of course, be understood that I do not wish to be limited thereto, since many modifications may be made, and I therefore contemplate by the appended claims to cover all such modifications as fall within the true spirit and scope of my invention.

I claim as my invention:

1. In a process of making a vehicle wheel including a drop center rim and an attaching flange, the steps of preforming a metal ring to provide it with two laterally extending edge portions, one of smaller diameter than the other, the edge portions being connected by an intermediate integral connecting flange, applying an axial pressure to an edge of the ring, said connecting flange being supported and held throughout a portion of its width during the application of axial pressure thereby to cause axial displacement of said lateral portion of smaller diameter with respect to said other lateral portion to form a folded flange, bending said folded flange generally radially inwardly to provide a wheel attaching flange, and rolling a drop center rim out of the remaining portion of said ring.

2. In a process of making a vehicle wheel including a drop center rim and an attaching flange, the steps of preforming a metal ring to provide it with two laterally extending edge portions, one of smaller diameter than the other, the edge portions being connected by an intermediate integral connecting flange, applying axial pressure to an edge of the ring, said connecting flange being supported and held throughout a portion of its width during the application of axial pressure and a remaining portion of said connecting flange being left unsupported, thereby to cause axial displacement of said lateral portion of smaller diameter with respect to said other lateral portion while maintaining said intermediate connecting flange fixed with respect to said last mentioned lateral portion, thus to form a folded axially extending flange one side of which is contiguous with said lateral portion of smaller diameter, bending said folded flange generally radially inwardly to provide a wheel attaching flange, and forming a wheel drop center rim out of the remaining portion of said ring.

3. In a process of making a vehicle wheel including a drop center rim and an attaching flange, the steps of preforming a metal ring to provide it with a step-shaped cross-section, applying axial pressure to an edge of the ring, the intermediate connecting portion of the step-shaped ring being supported and confined throughout a portion of its width during the application of axial pressure, thereby to cause an intermediate portion of the ring to progressively roll and unroll to form a folded flange, bending said folded flange generally radially inwardly to provide a wheel attaching flange, and forming a wheel drop center rim out of the remaining portion of said ring.

4. In a process of making a vehicle wheel including a drop center rim and an attaching flange, the steps of preforming a continuous circular member into a ring with laterally offset portions extending in opposite directions, forming an intermediate portion of said stepped ring and at the junction of said offset portions by pressure applied axially of said ring into a folded intermediate flange adapted to serve as a wheel attaching flange, and forming the edge margins of said offset portions of said ring into a drop center rim extending radially outward from said folded flange.

GEORGE ALBERT LYON.